United States Patent
Williamson et al.

(10) Patent No.: US 7,896,118 B2
(45) Date of Patent: Mar. 1, 2011

(54) STRETCHERS

(75) Inventors: Robert Williamson, West Yorkshire (GB); David Wyman, West Yorkshire (GB)

(73) Assignee: Ferno (UK) Limited, West Yorkshire (GB)

( * ) Notice: Subject to any disclaimer, the term of this patent is extended or adjusted under 35 U.S.C. 154(b) by 547 days.

(21) Appl. No.: 11/858,355

(22) Filed: Sep. 20, 2007

(65) Prior Publication Data
US 2009/0078479 A1    Mar. 26, 2009

(51) Int. Cl.
*B62D 61/12* (2006.01)
(52) U.S. Cl. ............................... 180/209; 5/600; 5/620
(58) Field of Classification Search ................... 180/15, 180/23, 209; 5/600, 620
See application file for complete search history.

(56) References Cited

U.S. PATENT DOCUMENTS

| | | | |
|---|---|---|---|
| 1,327,376 A * | 1/1920 | Delieuvin | 180/14.6 |
| 5,083,625 A | 1/1992 | Bleicher | |
| 6,076,209 A * | 6/2000 | Paul | 5/617 |
| 6,098,732 A * | 8/2000 | Romick et al. | 180/23 |
| 6,178,575 B1 | 1/2001 | Harada | |
| 6,598,247 B1 * | 7/2003 | Heimbrock et al. | 5/86.1 |
| 6,725,956 B1 | 4/2004 | Lemire | |
| 6,752,224 B2 * | 6/2004 | Hopper et al. | 180/22 |
| 6,880,202 B2 * | 4/2005 | Thompson et al. | 16/35 R |
| 7,007,765 B2 * | 3/2006 | Waters et al. | 180/19.3 |
| 7,191,854 B2 * | 3/2007 | Lenkman | 180/65.1 |
| 2003/0159861 A1 | 8/2003 | Hopper et al. | |
| 2004/0200646 A1 | 10/2004 | Waters et al. | |
| 2007/0170673 A1 * | 7/2007 | Figel et al. | 280/47.34 |

FOREIGN PATENT DOCUMENTS

| | | |
|---|---|---|
| EP | 0769286 A2 | 4/1997 |
| WO | 0185084 A1 | 11/2001 |

\* cited by examiner

*Primary Examiner*—Lesley Morris
*Assistant Examiner*—Maurice Williams
(74) *Attorney, Agent, or Firm*—Dinsmore & Shohl LLP

(57) ABSTRACT

A trolley is provided and includes at least one driven wheel and non-driven wheels. The at least one drive wheel may be moved to a position clear of the ground or to a position in which it contacts the ground with the adjacent non-driven wheels being raised off the ground. Movement between these two positions is effected by pivoting a sub-frame to which the driven wheel and the non-driven wheels are connected. During this movement, the region of the trolley above the driven wheel is first lowered and then raised slightly such that the end elevation of the support for a patient remains the same.

12 Claims, 4 Drawing Sheets

STRETCHERS

FIELD OF THE INVENTION

The present invention relates to a stretcher and a method of operating a stretcher. Herein any reference to a stretcher includes a stretcher trolley.

BACKGROUND OF THE INVENTION

Stretchers are presently maneuvered manually by an operator who exerts the forces required to direct and move the stretcher about hospital ward, between wards, between ambulances and between ambulances and incidents. During the course of maneuvering the stretcher the operator has to exert a considerable force in order to control the stretcher. The effect can be bad for the back of the operator. The force is increased when maneuvering the stretcher up steep inclines or ramps, such as an ambulance ramp or hospital ramp. Furthermore, the wheels of the stretcher are mounted on swivels, which, particularly if the ramp tilts to one side (such as may occur when the vehicle is not parked on level ground), as the operator pushes the stretcher up it can run off the stretcher. In addition the stretcher can run off course when going up or down hill or on a slope. Alternatively, the stretcher can run away down hill if on a steep hill or if the operator slips and loses grip. All of these problems are accentuated when the patient on the stretcher is particular heavy.

SUMMARY OF THE INVENTION

It is a feature of the present invention to attempt to overcome at least some of the above or other disadvantages.

According to one aspect of the present invention a stretcher trolley arrangement includes at least three non-driven wheels and at least one driven wheel, the driven wheel being moveable relative to at least one of the non-driven wheels between a driving position in which the driven wheel is in contact with the ground and a non-driving position in which the driven wheel is spaced from the ground.

At least one of the driven wheels or a non-driven wheel may be moveable mounted on the stretcher in order to effect the movement between the two positions.

In the travelling position at least one of the non-driven wheels may be spaced on the ground. The driven wheel may be pivotally mounted on the stretcher about an axis offset from that wheels rotational axis to effect the movement between the driven and non-driven positions.

The movement in at least one direction between the positions may be effected by a drive mechanism.

The drive mechanism may be arranged to hold the stretcher in at least one of the positions with the hold being exerted in at least one of the positions being releasable.

The movement from at least one position to another may be effected by manual movement of a telescopic arm.

The movement in at least one direction between the positions may be effected by a drive mechanism which may include an extendable and contractible member pivotably connected to the stretcher and a link at a location spaced from the pivotal mounting of the link to the stretcher.

The movement from the driving position to the non-driving position may be at least initially pivotal movement about the point of contact of the driven wheel with the ground.

The driven wheel may be larger than the non-driven wheel such as being more than twice the diameter of the non-driven wheel.

When the wheel is in the driving position the drive may be arranged to be able to act as a brake should the stretcher be going down an incline.

The arrangement may include a battery arranged to power the drive wheel. A battery may be arranged to drive the movement between at least one of the positions.

The angle of the axis of the driven wheel may be fixed with respect to the longitudinal extend of the stretcher.

The axis of at least one non-driven wheel may be able to move about an upwardly extending axis and may be selectively lockable in at least one position of the upwardly extending axis.

The driven wheel may be located between non-driven wheels in the direction of longitudinal extend of the stretcher.

The non-driven wheel may be located towards one end of the stretcher in the region of a support extending up from a lower region of the trolley to a support for a body. The driven wheel may be pivotally connected to the support. The driven wheel and the non-driven wheel may be located in the region of the support with each being either side of the support in the longitudinal extent of the trolley.

According to a further aspect of the present invention a method of operating a stretcher arrangement that includes at least three non-driven wheels and at least one driven wheel comprises moving at least one of the wheels between a driving position in which the driven wheel is in contact with the ground and a non-driving position in which the driven wheel is spaced from the ground.

The method may comprise causing at least one non-driven wheel to be clear of the ground in the driving position. The method may comprise causing the non-driven wheel to be clear of the ground in the driving position at a location spaced from the longitudinal extent of the remaining wheels in contact with the ground.

Further features of the present invention are defined in the claims.

The drive mechanism may include, although by no means be limited to, linear lead-screw actuators, hydraulic actuators, or electro-hydraulic actuators.

The present invention includes any combination of the herein referred to features or limitations.

BRIEF DESCRIPTION OF THE DRAWINGS

The present invention can be carried into practice in various ways but several embodiments will now be described, by way of example, with reference to the accompanying drawings, in which.

DETAILED DESCRIPTION OF THE PREFERRED EMBODIMENTS

Figure 1:
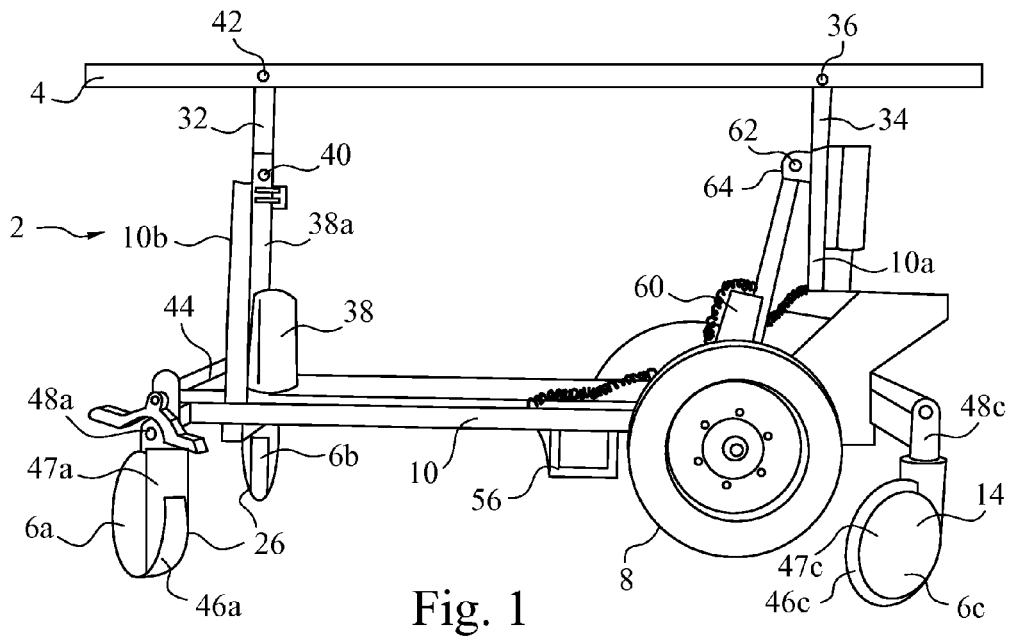
FIG. 1 is a side perspective view of a stretcher trolley showing the patient support, castor wheels, a driven wheel, and a main frame.
Figure 2:
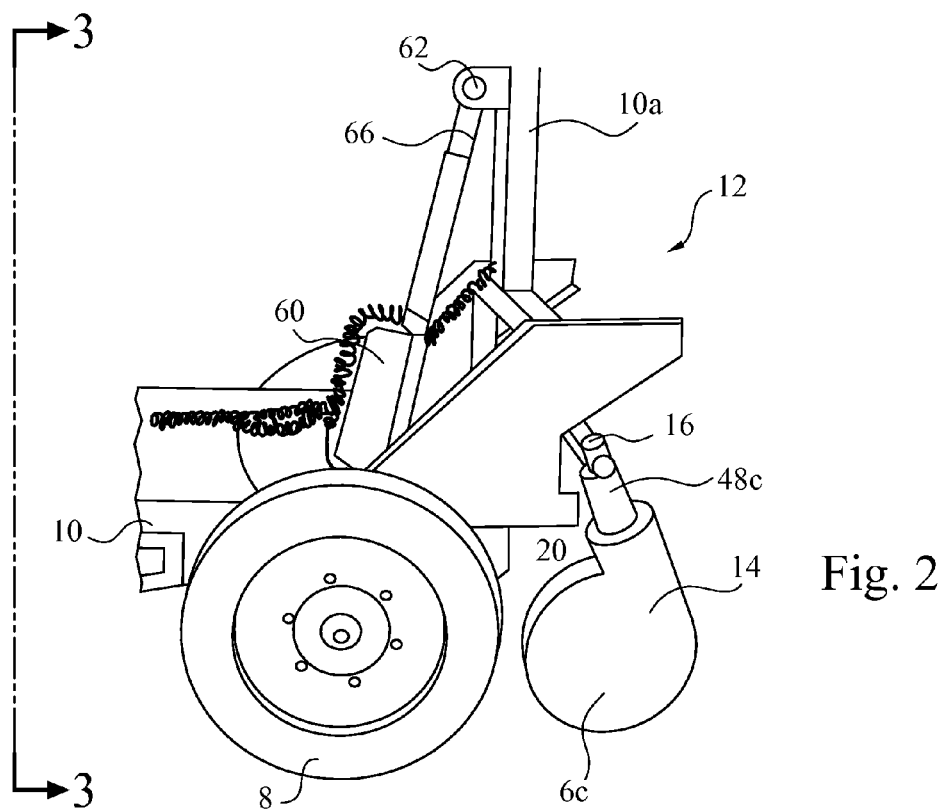
FIGS. 2 and 3 are a side perspective and rear perspective view of the rear trolley end region showing the rear castor wheels and the driven wheels connected to a sub frame. The sub frame is assembled to the main frame at a fixed pivot point to enable it to rotate about a first axis.

As shown FIGS. 1 and 2, the patient support 4 is mounted on a first support 32, which extends upwardly from the front of the main frame 10, and a second support 34, which extends upwardly from the rear of the main frame 10 so that the patient support 4 is held mainly flat or horizontal.

The lower end of the second, rear support 34 is fixed to an upwardly extending arm 10a of the main frame 10. The upper end region of the second, rear support 34 is connected by a first group of co-operating parts 36 to the patient support 4.

The lower end region of the first, front support 32 is attached to a piston of a first linear actuator 38 by a second group of co-operating parts 40. The upper end region of the first support 32 is connected by a third group of co-operating parts 42 to the patient support 4. The lower end of the actuator 38 is fixed to an upwardly extending arm 10b of the main frame 10. The configuration of the patient support 4, the first support 32, the second support 34, the first linear actuator 38, and the three groups of co-operating parts 36 and 42 is such that the first linear actuator may be driven to extend or contract a piston 38a of the linear actuator in order to incline or decline the angle of the patient support 4. When inclined, the patient support 4 may, for instance, be raised up to 15° to drain fluid from the legs of a patient on the support 4 with pivot occurring about the parts 36.

The first linear actuator 38 may be controlled by an operator controlling a two-position or multi-position switch, such as a rocker switch (not shown), which may be positioned at the rear of the trolley. A battery 56 mounted on the main frame 10 is able to power the actuator 38 in order to extend or contract the piston 38a using any well known method.

The main frame 10 provides the housing for the two front castor wheels 6a and 6b. The castor wheels 6a and 6b are aligned substantially in the same plane and at the first trolley end region and are spaced apart laterally across the stretcher, generally being positioned on the widest portion of the main frame 10. The front castor wheels are able to rotate about a horizontal axis and can swivel about a vertical axis on a stub shaft 47, offset from the horizontal axis.

The rear castor wheels 6c and 6d are able to rotate in the same way as the front castor wheels and, in addition.

Figure 3:
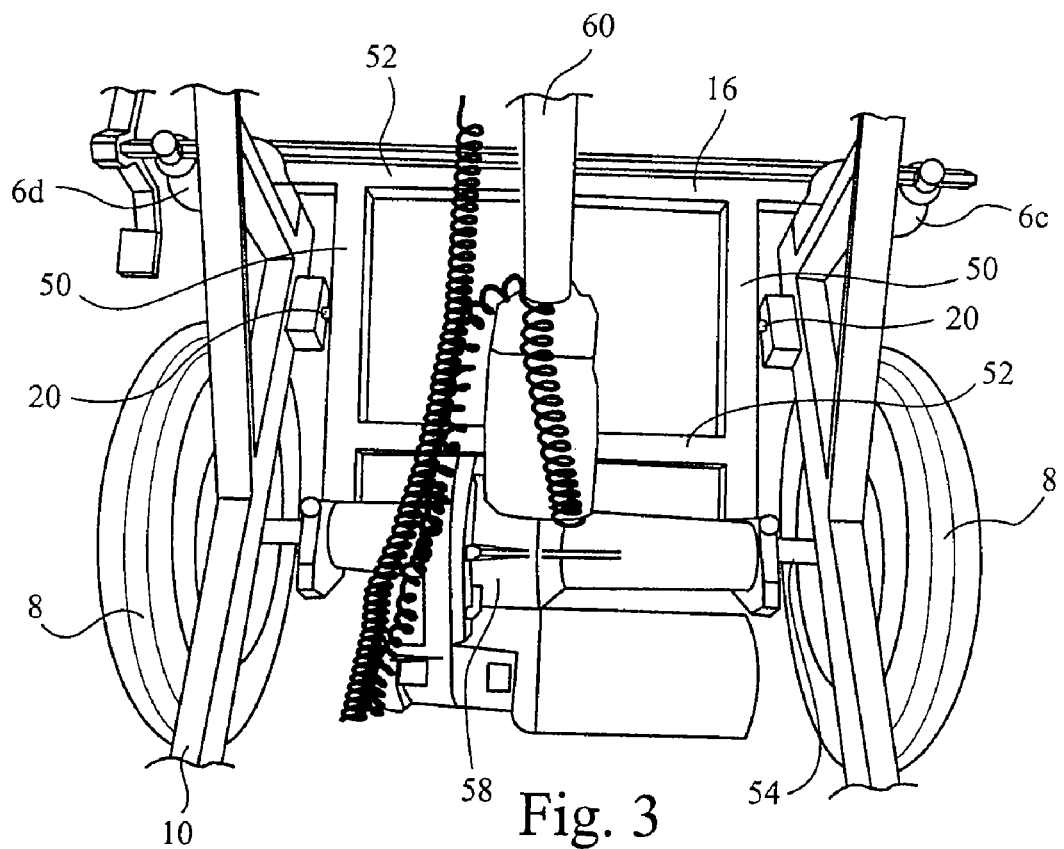

As shown in relation to FIGS. 2 and 3, a sub frame comprising of two side rails 50 and two cross rails 52 is pivotally mounted at points 20 on the main frame 10 at the rear end such that the sub frame 16 is able to pivot about a horizontal axis.

A rear castor wheels 6c and 6d are located on the rearward projecting end region of the sub frame 16. The castor wheel sub axles 48 of the rear castor wheels pivot with the sub frame about the pivot points 20.

The driven wheels 8 are mounted on axles 54 that project from a forward region of the sub frame, spaced from the pivot points 20 of the sub frame. The battery 56 powers a drive mechanism such as motor 58 mounted on the axle 54 or the sub frame 16 in order to drive the axle 54 and subsequently the wheels 8 in any well known manner. For instance, the motor may impart a drive via an induction force being applied to a magnet fast with the axles 54.

A second actuator 60 controls the movement of the sub frame 16 about the pivot points 20. The second actuator 60 is rotatably fixed at the upper end to the upwardly extending arm 10a just forward of that arm. The lower end of the actuator 60 is pivotally connected to the axle 54 of the sub frame 6 such that when the piston 66 of the second actuator 60 is located on the sub frame 16 moves up or down through a circumferential path by rotating about the pivot points 20.

The battery 56 powers the actuator 60 to extend or contract a piston 66 of the actuator. A two-position switch, such as a rocker switch (not shown), which may be positioned at the rear end of the trolley and controlled by an operator, may control the extension or contraction of the actuator 60.

Figure 4:
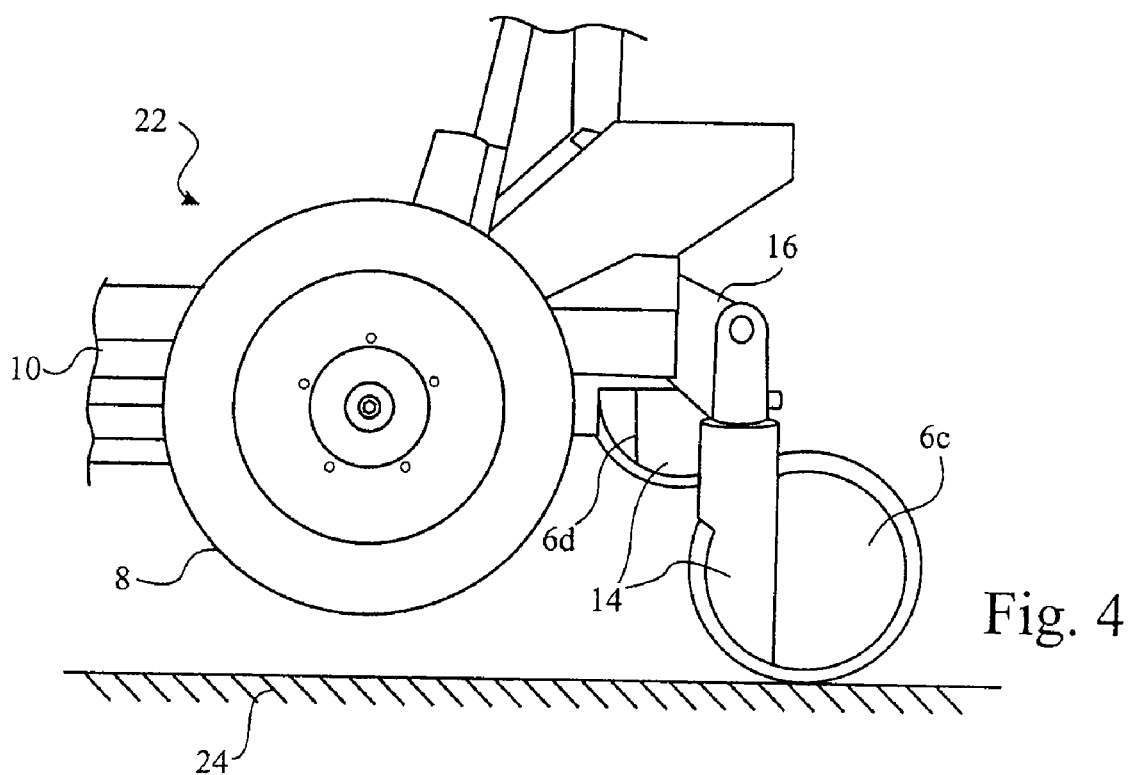
FIG. 4 is a side view of a first transition position showing the rear castor wheels in contact with the surface and the driven wheels free from the surface such that the stretcher trolley is solely supported by castor wheels.
Figure 5:
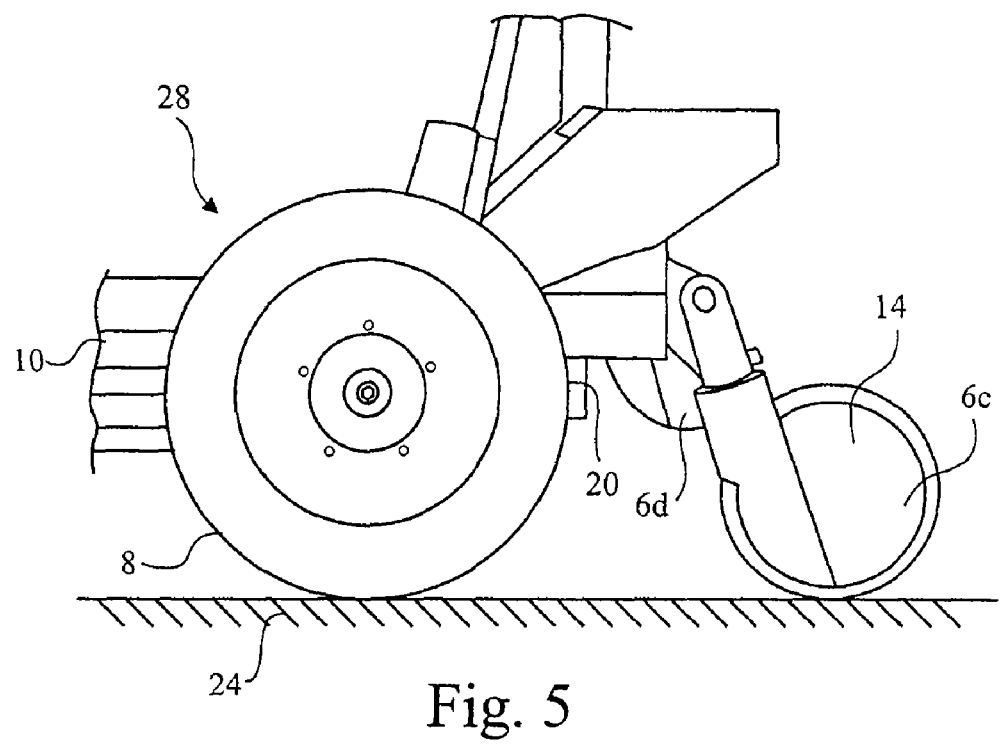
FIG. 5 is a side perspective view of a mid transition position showing the driven wheels and all castor wheels in contact with the surface.
Figure 6:
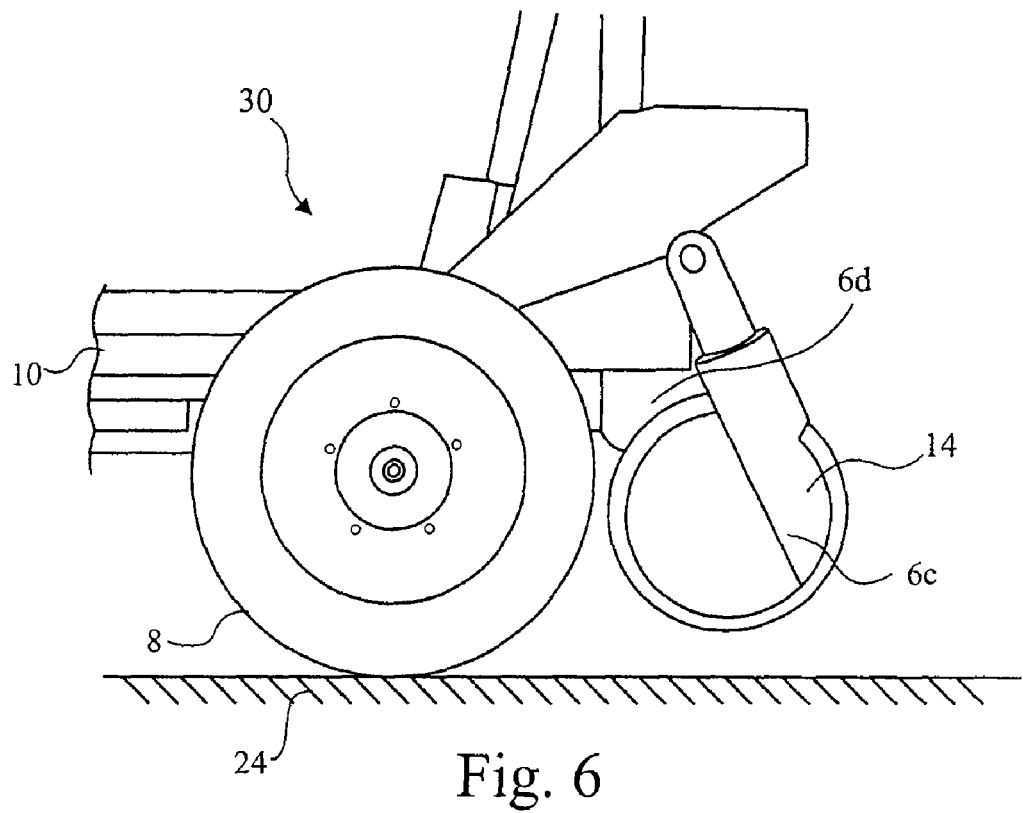
FIG. 6 is a side perspective view of a second transition position showing the driven wheels in contact with the surface with the rear castor wheels clear from the surface such that the trolley is solely supported by the front castor wheels and the driven wheels.

It should be clear from FIGS. 4, 5 and 6 that extending the piston 66 of the actuator 60 effects a movement between the first, mid, and second transition positions of the surface 24. In the second transition position the co-operating parts of the actuator resist any rotational movement of the sub frame 16. During the transition between the first position 22 and the second position 30 the patient support 4 moves only marginally. It can be seen that as the rear of the trolley is being moved between the position shown in FIGS. 7 and 8 the castor wheels are moved down, initially, to cause a slight lowering of the pivot points 20 about the contact of the driven wheels with the ground until the castors contact the ground. Then the pivot points 20 are raised slightly about the contact point of the castors with the ground. Accordingly the inclination change of the patient support 4 is minimal and the support is at substantially the same inclination regardless of the positions shown in FIGS. 7 and 8.

It is possible to lock the castors in a fixed rotational position about the stub axles. Thus, if the stub axles are locked in the position shown in FIG. 8 when, or after the driven wheels only at the rear contact the ground, as in FIG. 7, there is significant clearance for the trolley to negotiate small steps or ledges without the rear castor wheels contacting the step or ledge. In the locked position the tangent between the raised castor wheels and the driven wheels and the included angle to the horizontal may be more than 8°, or more than 10°, or in the region of 12°-15°.

When the second trolley end region 12 is orientated in the second transition position, the stretcher can be moved by an operator at the rear of the trolley using a lever, which initiates and varies the speed of rotation of the drive shaft from the motor and the speed of travel of the trolley. Similarly, the lever can be moved in an opposite direction to initiate and vary the speed of reverse rotation of the axle 54. The motor may include a positive drive that prevents the axle 66 from being able to rotate faster than that set by the lever to prevent the runaway of the stretcher down inclines.

Furthermore, it will be appreciated that not all of the power to move the stretcher need be applied by the motor and an operator could assist in providing the necessary power.

Should the motor fail or should it be desired to maneuver the stretcher in a traditional manner, both sets of castor wheels 26 and 14 or the front castor wheels and the driven wheels may be used. The actuator piston 66 may contract to initiate the transition to the first position 22. Alternatively the actuator may relax such that all driven and non-driven wheels contact the ground.

Figure 7:
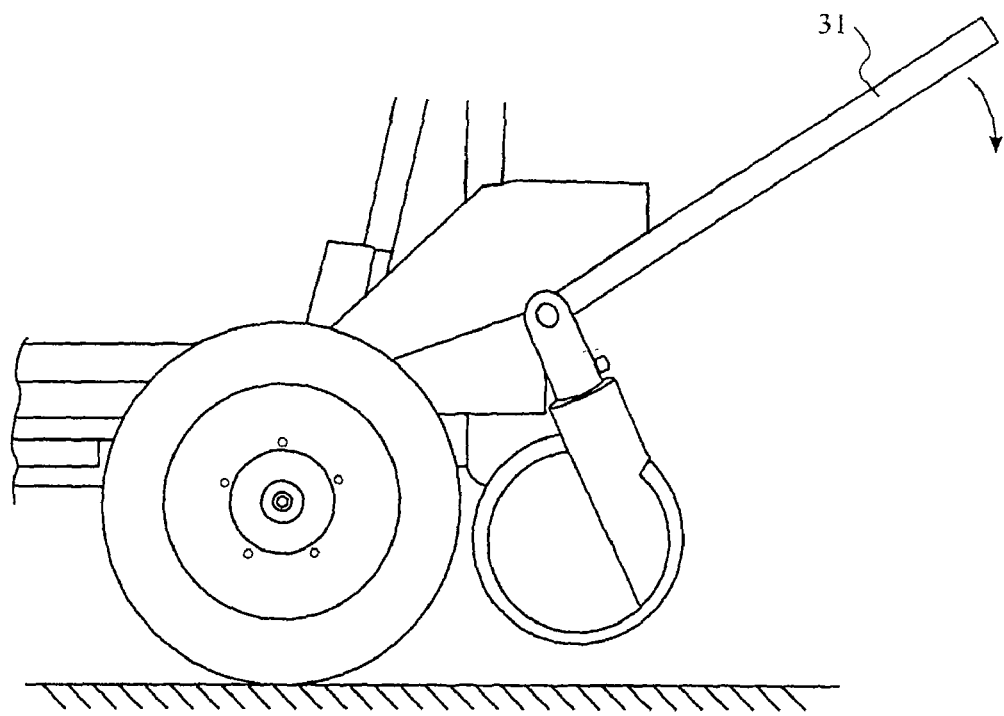
FIGS. 7 and 8 show side views in the two transition positions effected by pulling a lever down.
Figure 8:
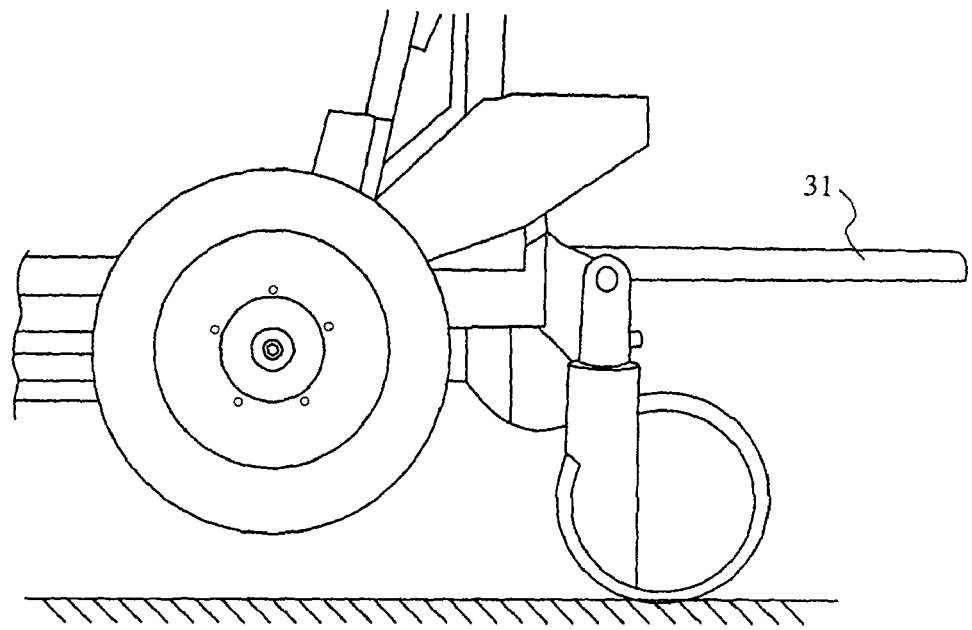

Should the battery fail the transition may be effected manually as depicted by FIGS. 7 and 8. A telescopic lever 31 held fast to the sub frame is extended from the sub frame 16 by any well-known mechanism. The actuator piston 66 is unloaded such that the co-operating parts of the actuator 60 do not resist rotational movement of the sub frame 16. A downwards force exerted on the lever 31 by the hand or foot of an operator acts to rotate the sub frame 16 in to the first transition position. The actuator piston 66 may be re-locked in order to impart the necessary rotational movement of the sub frame 16 or the lever may be moved sideways to engage with a locking part of the main frame. Return movement and locking is a reverse of this operation.

The pistons may comprise linear actuators whereby a nut is axially fixed but rotated to drive the piston axially with regard to the rotation of the nut.

All of the features disclosed in this specification (including any accompanying claims, abstract and drawings), and/or all of the steps of any method or process so disclosed, may be combined in any combination, except combinations where at least some of such features and/or steps are mutually exclusive.

We claim:

1. A stretcher including a least three non-driven wheels and at least one driven wheel moveably mounted on the stretcher, the driven wheel being movable relative to at least one of the non-driven wheels between a driven position in which the driven wheel is in contact with the ground and at least one non-driven wheel moveably mounted on the stretcher spaced from the ground and a non-driven position in which the driven wheel is spaced from the ground and the non-driven wheel is in contact with the ground, wherein the driven wheel and the at least one non-driven wheel are connected to a link that is pivotally mounted on the stretcher with, in the longitudinal extent of the stretcher, the rotational axis of the driven wheel being on one side of the pivotal mounting of the link on the stretcher and the rotational axis of the non-driven wheel being on the other side of the pivotal mounting of said link, wherein the pivotal movement of said link being arranged to cause the height of a patient support above the ground to first decrease and then to increase as movement occurs between the two positions.

2. The stretcher as claimed in claim 1 in which the height of a patient support above the region of the driven wheel is substantially the same in both positions.

3. The stretcher as claimed in claim 1 in which, in the driving position, at least one of the non-driven wheels is spaced from the ground and is spaced from the extent between the non-driven wheels in contact with the ground and the driven wheels.

4. The stretcher as claimed in claim 3 in which a non-driven wheel that is spaced from the ground is rotatable about its own wheel axis and a further axis spaced from that axis whereby the non-driven wheel can be moved about that further axis and locked in position about that further axis to move that non-driven wheel further from the ground.

5. The stretcher as claimed in claim 4 in which that further axis is an upwardly extending axis.

6. The stretcher as claimed in claim 1 in which the movement in at least one direction between the positions is effected by a drive mechanism and in which the drive is arranged to hold the stretcher in at least one of the positions.

7. The stretcher as claimed in claim 6 in which the movement from at least one position to another is effected manually.

8. The stretcher as claimed in claim 7 in which the movement is effected by means of a lever.

9. The stretcher as claimed in claim 8 in which the link is constrained to move with the lever about the pivot axis of the link.

10. The stretcher as claimed in claim 9 in which the lever is movable to a locking condition to restrain pivotal movement of the link in at least one position.

11. The stretcher as claimed in claim 10 in which the pivotal connection of the drive mechanism to the link is coincident with the rotational axis of at least one of the driven wheel or a non-driven wheel.

12. The stretcher as claimed in claim 1 in which the stretcher is adapted such that the movement from the driving to the non-driving position is at least initially pivotal movement about the point of contact of the driven wheel with the ground and is, at least towards the end of that movement, pivotal movement about the contact of the at least one non-driven wheel.

* * * * *